United States Patent
Mun et al.

(10) Patent No.: US 10,181,044 B2
(45) Date of Patent: Jan. 15, 2019

(54) SYSTEM AND METHOD FOR MONITORING ENCRYPTED DATA AND PREVENTING MASSIVE DECRYPTION THEREOF

(71) Applicant: EGLOBAL SYSTEMS CO., LTD., Seoul (KR)

(72) Inventors: Dae Won Mun, Seongnam-si (KR); Yu Ho Kim, Seoul (KR); Don Seob Cho, Seoul (KR)

(73) Assignee: Eglobal Systems Co., Ltd., Seoul (KR)

( * ) Notice: Subject to any disclaimer, the term of this patent is extended or adjusted under 35 U.S.C. 154(b) by 122 days.

(21) Appl. No.: 15/117,192

(22) PCT Filed: Jul. 3, 2014

(86) PCT No.: PCT/KR2014/005935
§ 371 (c)(1),
(2) Date: Aug. 6, 2016

(87) PCT Pub. No.: WO2015/119341
PCT Pub. Date: Aug. 13, 2015

(65) Prior Publication Data
US 2016/0350546 A1  Dec. 1, 2016

(30) Foreign Application Priority Data
Feb. 7, 2014 (KR) .................. 10-2014-0014034

(51) Int. Cl.
*G06F 21/00* (2013.01)
*G06F 21/62* (2013.01)
(Continued)

(52) U.S. Cl.
CPC .............. *G06F 21/62* (2013.01); *G06F 21/10* (2013.01); *G06F 21/31* (2013.01); *G06F 21/602* (2013.01); *G06F 21/6281* (2013.01); *H04W 4/14* (2013.01)

(58) Field of Classification Search
CPC .......... G06F 21/62; G06F 21/31; G06F 21/10; G06F 21/602; G06F 21/6281; H04W 4/14
See application file for complete search history.

(56) References Cited

U.S. PATENT DOCUMENTS 6,243,470 B1 *  6/2001  Coppersmith ........ H04L 9/0625
380/259
8,539,254 B1 *  9/2013  Bridgford ............... H04L 67/34
713/100
(Continued)

FOREIGN PATENT DOCUMENTS

JP    2001272912 A    10/2001
JP    2002169912 A    6/2002
(Continued)

OTHER PUBLICATIONS

International Search Report and Written Opinion corresponding to International Patent Application No. PCT/KR2014/005935, dated Oct. 30, 2014, 7 pages.

*Primary Examiner* — Morshed Mehedi
(74) *Attorney, Agent, or Firm* — Lathrop Gage L.L.P.

(57) ABSTRACT

The present invention is a system for monitoring encrypted data and preventing the encrypted data from being decrypted in large quantities, the system comprising: an access control unit which stores information of a decryption; a crypto-unit which receives the information of the decryption from the access control unit and decrypts the encrypted data; a counter which counts the number of the process of the decryption processed by the crypto-unit; an event logger which stores the number of the process of the decryption counted by the counter; and a monitoring server which receives the information of the number of the decryption and displays it.

19 Claims, 3 Drawing Sheets

(51) Int. Cl.
*G06F 21/10* (2013.01)
*G06F 21/60* (2013.01)
*G06F 21/31* (2013.01)
*H04W 4/14* (2009.01)

(56) References Cited

U.S. PATENT DOCUMENTS

| | | | | |
|---|---|---|---|---|
| 2008/0253563 | A1* | 10/2008 | Chang | G06F 21/10 |
| | | | | 380/200 |
| 2009/0083848 | A1* | 3/2009 | Lawlor | G07F 7/08 |
| | | | | 726/18 |
| 2009/0103721 | A1* | 4/2009 | Sada | H04K 1/02 |
| | | | | 380/42 |
| 2010/0174919 | A1* | 7/2010 | Ito | G06F 21/554 |
| | | | | 713/192 |
| 2014/0130117 | A1* | 5/2014 | Jeannot | H04L 63/08 |
| | | | | 726/1 |

FOREIGN PATENT DOCUMENTS

| | | |
|---|---|---|
| KR | 1020100002592 A | 1/2010 |
| KR | 1020120056719 A | 6/2012 |
| KR | 1020130024388 A | 3/2013 |

\* cited by examiner

[Fig. 1]
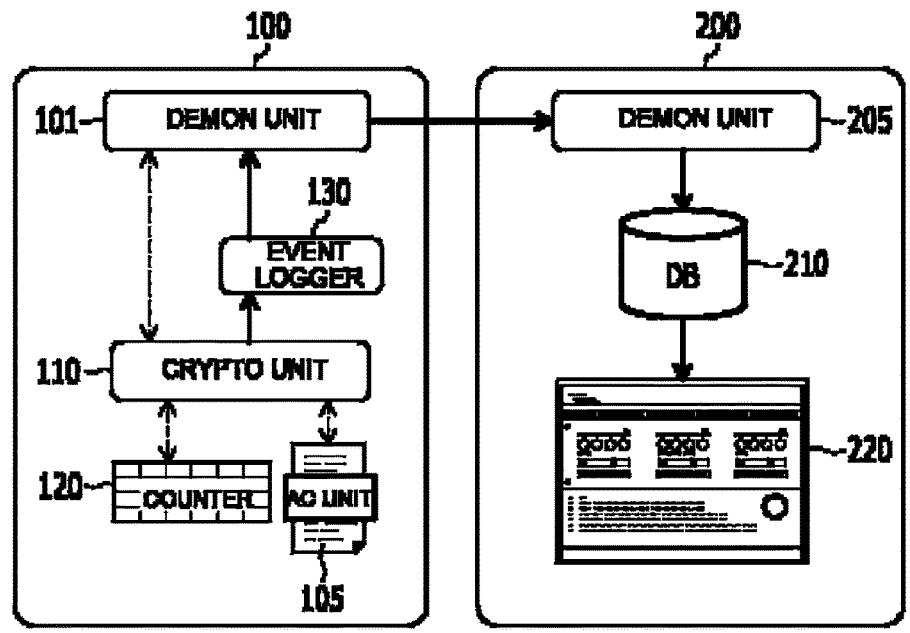
(a)
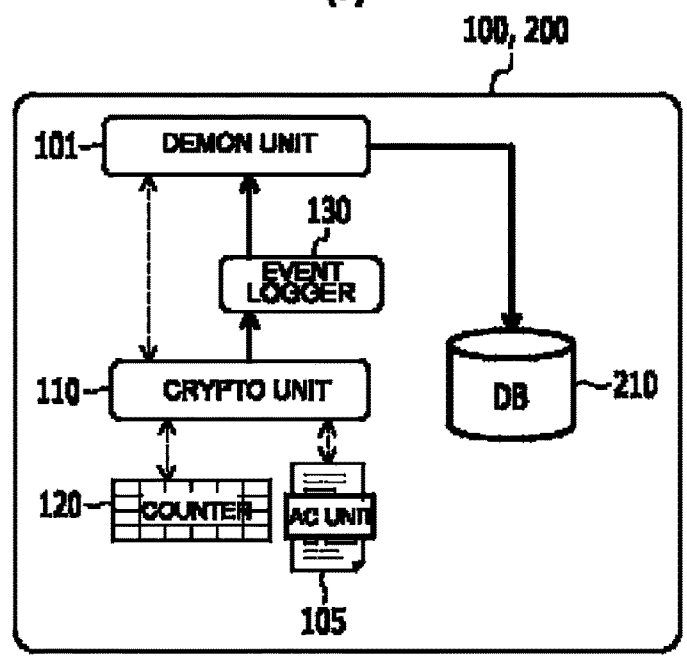
(b)

[Fig. 2]
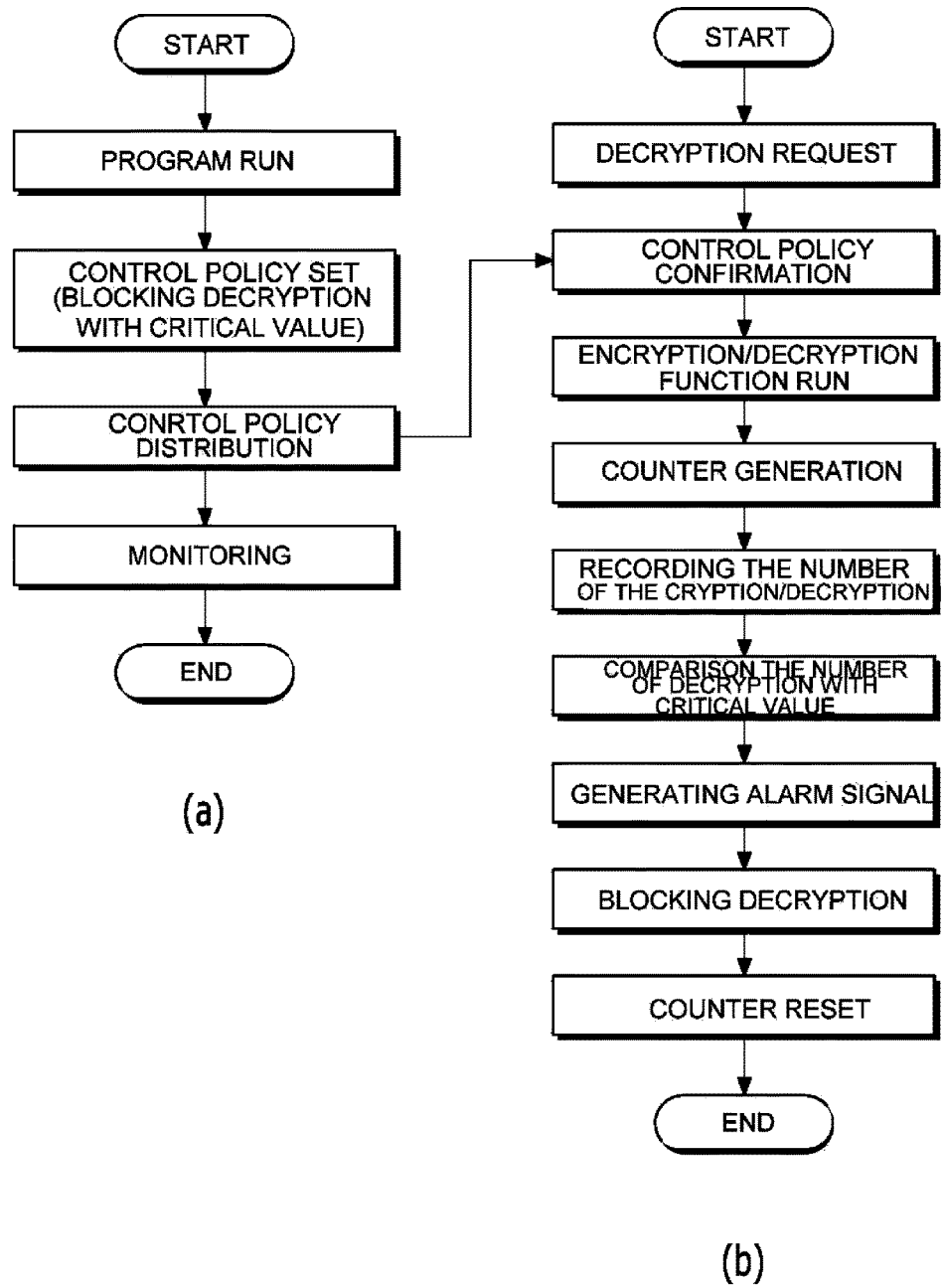

[Fig. 3]

SYSTEM AND METHOD FOR MONITORING ENCRYPTED DATA AND PREVENTING MASSIVE DECRYPTION THEREOF

TECHNICAL FIELD

The present invention is related to a system and a method for monitoring encrypted data and preventing the encrypted data from being decrypted in large quantities. More specifically, the present invention monitors the process of an error handling of the encryption and decryption in a database which stores important information or sensitive information, and takes action against them in real time. In a normal state of the encryption database, the present invention can perceive an attempt to leak confidential information by encryption, generate an alarm signal and stop the information from leaking out.

BACKGROUND ART

One of the methods to encrypt or decrypt a database which is usable or approachable by the multiple users installs a cryptographic module in a database server and processes the encryption/decryption while inquiring about the stored data by database management system (DBMS) with structured query language (SQL).

Another method to encrypt or decrypt the database installs a cryptographic module in an application server irrelevant to the database, and encrypts/decrypts the data.

Whatever form it takes, in the process of data processing, as the encryption/decryption is automatically operated in accordance with a call from a program, the administrator cannot monitor the data processing. Thus, before the administrator is informed by other notification systems or can examine the database system, he or she cannot perceive the fact that the encryption/decryption is happening, so the encryption/decryption which is not perceived can go on for a long time.

Until now, although technology for monitoring the state of the process of a database exists, there has been no technology for monitoring the process of encryption/decryption of a cryptographic module which is installed at a database server.

One of the security problems which can be generated in an operating encrypted database normally cannot prevent a licenser from intentionally leaking confidential information.

Although various security services applied to the network and put into operation can organize the structure of control, the control using the security services which is directly irrelevant to the process of the data is indirect and its reliability is poor. As a rule based access control (RBAC), because the common security services also control the access to the DBs, files or disks only, a licensor who meets with the requirement of permission cannot directly control the abnormal decryption of the mass data, so further controls in accordance with other methods are needed.

DISCLOSURE OF INVENTION

Technical Problem

First, the present invention seeks to provide a system and method for monitoring and preventing a licensor from leaking security information.

Second, if the licensor accesses and decrypts the encrypted data, the present invention seeks to provide a system and method for counting or accumulating the number of the decryption of the encrypted data in accordance with the time.

Third, the present invention seeks to provide a system and method for monitoring the mass decryption for monitoring the mass decryption which is generated in a short time, and informing a surveillant of these monitored situations.

The suggested improvements of the present invention are not limited by the descriptions above, and other improvements which are not described could be understood by a skilled artisan as follows.

Solution to Problem

The present invention is a system for monitoring encrypted data and preventing the encrypted data from being decrypted in large quantities, so the system comprises: an access control unit which stores information of a decryption; a crypto-unit which receives the information of the decryption from the access control unit and decrypts the encrypted data; a counter which counts the number of the process of the decryption processed by the crypto-unit; an event logger which stores the number of the process of the decryption counted by the counter; and a monitoring server which receives the information of the number of the decryption and displays it.

The present invention further comprises a demon unit which receives the number of the process of the decryption stored in the event logger and transmits it to the monitoring server.

The counter of the present invention is one selected from the group consisting of a memory, a file, a DB table and an external server.

The information of the decryption of the present invention comprises the conditions of the permission for the decryption and a critical value for the number of the process of the decryption regarding each permission for the decryption; and wherein the monitoring server stops the crypto-unit from decrypting and generates an alarm signal if the number of the process of the decryption reaches the critical value.

The monitoring server of the present invention comprises: a database which receives the information about the number of the process of the decryption and stores it; and a monitoring unit which displays the received and stored information about the number of the process of the decryption by means of a GUI on a dashboard.

The crypto-unit of the present invention records information comprising at least one selected from the group consisting of the account information of a user who requests the decryption, the server name of the user, the IP address of the user or the application name of the user.

Every permission for the decryption of the present invention varies in accordance with the types of the user ID requesting the decryption, the IP address or the application name.

The critical value of the present invention is a predetermined value per time unit which can be arbitrarily adjustable.

The counter of the present invention counts the number of the process of the decryption based on a session of the encrypted data.

The counter of the present invention counts the number of the process of the decryption based on a processor or thread of the application requesting the decryption.

The monitoring server of the present invention transmits the alarm signal to a terminal of a manager who operates the monitoring server.

The alarm signal of the present invention is transmitted to the terminal by means of an e-mail or an SMS.

The critical value of the present invention has a plurality of stages.

The present invention according to the method for monitoring encrypted data and preventing the encrypted data from being decrypted in large quantities comprises: (a) decrypting the encrypted data by using a crypto-unit; (b) counting the number of the process of the decryption by using the crypto-unit; (c) receiving the information of the number of the process of the decryption; (d) comparing the number of the process of the decryption with a critical value; and (e) stopping the crypto-unit from decrypting if the number of the process of the decryption reaches the critical value.

Step (b) of the present invention cumulatively counts the number of the process of the decryption based on a session of the encrypted data.

Step (b) of the present invention cumulatively counts the number of the process of the decryption based on a processor or thread of the application requesting the decryption.

Step (b) of the present invention cumulatively counts the number of the process of the decryption in accordance with the types of the use ID requesting the decryption, the IP address or the application name.

Step (b) of the present invention counts the number of the process of the decryption per time unit.

The method of the present invention further comprises: after step (e), alarming that the number of the process of the decryption has reached the critical value by transmitting an alarm signal to the monitoring server.

The alarm signal of the present invention is transmitted to the terminal by means of an e-mail or an SMS.

The critical value of the present invention has a plurality of stages which can be arbitrarily adjustable.

A plurality of stages of the critical values have different alarm signals in accordance with their different stages.

Advantageous Effects of Invention

The present invention according to the system and method for monitoring encrypted data and preventing massive decryption including the above constitutions has the following effects.

First, the present invention can monitor the process of the encrypted modules in real time, give a warning signal to the surveillant and then send an SMS or an e-mail to him, and enable him to take action properly and promptly.

Second, the present invention can control the number of the decryption which is processed by someone who has access permission, so the present invention can prevent the encrypted data from being leaked, can cope with the attack of SQL injection which has previously been considered impossible to block.

BRIEF DESCRIPTION OF DRAWINGS

FIG. 1 illustrates a block diagram showing elements and mutual relations thereof, according to an embodiment of the present invention.

FIG. 2 illustrates a flow chart showing a process for monitoring decryption in large quantities by an authorized person and preventing them from being decrypted, according to an embodiment of the present invention.

FIG. 3 illustrates an example of the GUI presented by the monitoring unit of the monitoring server, according to an embodiment of the present invention.

BEST MODE FOR CARRYING OUT THE INVENTION

The present invention according to the system and method for monitoring encrypted information and preventing massive decryption can have various alterations and examples. Specific examples are shown in the drawings and are detailed in the specification. However, these are not intended to limit the technical spirit of the present invention. Rather, it should be understood that all alterations, all equivalents or all substitutes are included in the present invention.

FIG. 1 illustrates a block diagram showing elements and mutual relations thereof, according to an embodiment of the present invention. FIG. 2 illustrates a flow chart showing a process for monitoring decryption in large quantities by an authorized person and preventing them from being decrypted, according to an embodiment of the present invention. FIG. 3 illustrates an exemple of the GUI presented by the monitoring unit of the monitoring server, according to an embodiment of the present invention.

As illustrated in FIG. 1, the system for monitoring encrypted information and preventing massive decryption according to the present invention comprises an access control unit 105; a crypto-unit 110; a counter 120; an event logger 130; and a monitoring server 200.

First, as the elements explained above are sub-elements of the DB/application server 100, these elements are included in the DB/application server 100.

The DB/application server 100 can have an access right to an encrypted database (not shown). The DB/application can be separated from the monitoring server 200 (see FIG. 1(a)), or alternatively, it can be combined with the monitoring server 200 in one server (see FIG. 1(b)) but perform operations different from the monitoring server 200. Though FIG. 1 shows that the DB/application server 100 is physically separated from the monitoring server 200, the technical features of the present invention should be understood in light of those functions, so the scope of the present invention should not limited by the example of FIG. 1.

The access control unit 105 is an element that stores encrypted data—i.e., decryption information for the database.

This decryption information is arbitrarily set by an administrator. More specifically, it comprises conditions of permission for the decryption and a critical value for the number of the process of the decryption regarding each permission for the decryption.

More specifically, every permission for decryption can be differently varied in accordance with the types of the user ID requesting the decryption, the IP address requesting the decryption and the application name requesting the decryption.

Since permission for decryption can be varied in accordance with the types of the user ID requesting the decryption, the IP address requesting for the decryption and the application name requesting the decryption as explained above, it is natural that the critical value can also be varied in accordance with the types of the user ID requesting the decryption, the IP address requesting for the decryption and the application name requesting the decryption.

The critical value which is explained above means a maximum number for which decryption is permitted, so it can be arbitrarily adjustable—for example, a predetermined value per time or an accumulated number of the decryption. Furthermore, the critical value has one or more steps of numerical values because the relative seriousness of the decryption can be different in accordance with the number of the decryption.

The crypto-unit 110 is a module for encryption and decryption of the database. When performing decryption, the crypto-unit 110 can decrypt the encrypted data by referring to the information of the decryption as explained above. In other words, the crypto-unit 110 performs decryption in accordance with permission for the decryption.

The crypto unit 110 can generate counter 120 which will be stated below, make the counter 120 count the number of the decryption, and write the record about the counted number of the decryption. Furthermore, the crypto-unit 110 can write the information about the decrypted number of the decryption into the event logger 130 which will be stated below, and then, simultaneously, can directly, or by means of the demon unit 101, transmit the information to the monitoring server 200.

The counter 120 is an element that counts the number of the decryption performed by the crypto-unit 110. The crypto-unit 110 counts the number of the decryption and generates the counter 120, which can be one selected from the group of consisting of a memory, a file, a DB table and a remote server.

The counter 120 can separately count the number of the process of the decryption based on a processor or a thread of the application requesting the decryption.

The event logger 130 is an element that stores the number of the process of the decryption performed by the crypto-unit 110, and, at the same time, stores the comprehensive information about the decryption performed by the crypto unit 110.

All events that are decrypted by the crypto-unit 110—i.e., the content of the decryption and the list thereof and the error rate of the failure of decryption—are stored in the event logger 130, and are transmitted to the monitoring server 200 as explained above.

The crypto-unit 110 records information comprising at least one selected from the group consisting of the account information of a user who requests the decryption, the server name of the user, the IP address of the user and the application name of the user.

The monitoring server 200 receives the number of the process of the decryption and displays it.

As illustrated in FIGS. 1 to 3, the monitoring server 200 can comprise a database 210; and a monitoring unit 220.

The database 210 is an element that stores the information of the number of the process of the decryption received from the DB/application server 100.

As explained above, the monitoring unit 220 is the element that stores the information of the decryption—i.e., the conditions of the permission for the decryption and the critical value for the number of the process of the decryption regarding each permission for the decryption. The monitoring unit 220 compares the number of the process of the decryption performed by the crypto-unit 110 with the critical value stated above. The monitoring unit 220 generates alarm signals if the number of the process of the decryption reaches the critical value.

More specifically, the monitoring unit 220 transmits alarm signals to the administrator's terminal, and the means for transmitting the alarm signals can be various types of transmitting techniques—i.e., SMS or e-mail.

As illustrated in FIG. 3, the monitoring unit 220 can be configured to be intuitively monitored by graphical user interface (GUI) on the dashboard.

In FIG. 3, the term "crypto-event" is an interface that monitors some attempts to decrypt the encrypted data in large quantities from a certain IP address, the term "crypto-service" is an interface that monitors how the security policy can be loaded on the shared memory of the operating system (OS), and the term "access log" is an interface that displays various illegal attempts for decryption by an unauthorized program or an abnormal IP.

As explained above, this information is transformed into characters or graphics and then transmitted to the administrator's terminal by means of SMS or e-mail.

Hereinafter, the method for monitoring encrypted information and preventing massive decryption according to the present invention will be explained with FIG. 2.

First, the method for monitoring encrypted information and preventing massive decryption according to the present invention comprises steps (a) decrypting the encrypted data by using a crypto-unit; (b) counting the number of the process of the decryption by using the crypto-unit; (c) receiving the information of the number of the process of the decryption; (d) comparing the number of the process of the decryption with a critical value; and (e) stopping the crypto-unit from decrypting if the number of the process of the decryption reaches the critical value.

Step (b) of the present invention cumulatively counts the number of the process of the decryption based on a session of the encrypted data.

In addition, Step (b) of the present invention cumulatively counts the number of the process of the decryption based on a processor or thread of the application requesting the decryption, and cumulatively counts the number of the process of the decryption in accordance with the types of the use ID requesting the decryption, the IP address and the application name.

Furthermore, Step (b) of the present invention counts the number of the process of the decryption per time unit.

After Step (e), the method for monitoring encrypted information and preventing massive decryption according to the present invention is comprised in that when the number of the process of the decryption reaches the critical value an alarm signal is transmitted to the monitoring server.

As explained above, the alarm signal is transmitted to the terminal by means of an e-mail or an SMS so it enables an administrator to monitor the system in real time.

In addition, as explained above, the critical value has a plurality of stages which can be arbitrarily adjustable in the monitoring server 200, and has different alarm signals in accordance with the different stages. The information including several stages of the critical value and the different alarm signals in accordance with the different stages are stored in the access control unit 105. As several stages of the critical value generate different types of alarm, the administrator can identify the relative seriousness of the decryption.

The present invention according to the system and method for monitoring encrypted data and preventing massive decryption can have various alterations and examples. Specific examples are shown in the drawings and are detailed in the specification. However, these are not intended to limit the technical spirit of the present invention. Rather, it should be understood that all alterations, all equivalents or all substitutes are included in the present invention.

The invention claimed is:

1. A method for monitoring encrypted data and preventing the encrypted data from being decrypted in large quantities by using an application server and a monitoring server, the method comprising:

(a) storing information of a decryption;
(b) receiving the stored information of the decryption and decrypting the encrypted data in view of the information of the decryption;
(c) counting a number of a process of the decryption;
(d) storing the number of the process of the decryption; and
(e) using the monitoring server to receive and display the number of the process of the decryption;

wherein:

the information of the decryption comprises a condition of permission for the decryption and a critical value for the number of the process of the decryption regarding each permission for the decryption; and the monitoring server stops the decryption and generates an alarm signal if the number of the process of the decryption reaches the critical value.

2. The method of claim 1, wherein the counting is effectuated using one of a memory, a file, a database table, and an external server.

3. The method of claim 1, further comprising displaying the number of the process of the decryption via a GUI on a dashboard.

4. The method of claim 1, further comprising recording at least one of an account information of a user who requests the decryption, a server name of the user, an IP address of the user, and an application name of the user.

5. The method of claim 1, wherein each permission for the decryption varies in accordance with a type of a user ID requesting the decryption, an IP address, or an application name.

6. The method of claim 1, wherein the critical value is a predetermined value per time unit which is arbitrarily adjustable.

7. The method of claim 1, further comprising counting the number of the process of the decryption based on a session of the encrypted data.

8. The method of claim 1, further comprising counting the number of the process of the decryption based on a processor or thread of an application requesting the decryption.

9. The method of claim 1, further comprising transmitting the alarm signal to a terminal of an operator of the monitoring server.

10. The method of claim 9, wherein the alarm signal is transmitted to the terminal by means of an e-mail or an SMS.

11. The method of claim 1, wherein the critical value has a plurality of stages.

12. A method for monitoring encrypted data and preventing the encrypted data from being decrypted in large quantities by using an application server and a monitoring server, the method comprising:

(a) storing information of a decryption;
(b) receiving the stored information of the decryption and decrypting the encrypted data in view of the information of the decryption;
(c) counting a number of a process of the decryption;
(d) storing the number of the process of the decryption;
(e) using the monitoring server to receive and display the number of the process of the decryption; and
(f) using the monitoring server to stop the decryption and generate an alarm signal when the number of the process of the decryption reaches a critical value;

wherein, the information of the decryption comprises a condition of permission for the decryption and a critical value for the number of the process of the decryption for each permission for the decryption.

13. The method of claim 12, wherein step (c) cumulatively counts the number of the process of the decryption based on a session of the encrypted data.

14. The method of claim 12, wherein step (c) cumulatively counts the number of the process of the decryption based on a processor or thread of an application requesting the decryption.

15. The method of claim 12, wherein step (c) cumulatively counts the number of the process of the decryption in accordance with a type of a user ID requesting the decryption, an IP address, or an application name.

16. The method of claim 12, wherein step (c) counts the number of the process of the decryption per time unit.

17. The method of claim 12, wherein the alarm signal is transmitted to a terminal by means of an e-mail or an SMS.

18. The method of claim 12, wherein the critical value has a plurality of stages which are arbitrarily adjustable.

19. The method of claim 18, wherein the plurality of stages have different alarm signals.

* * * * *